3,119,913
TIME DELAY THERMAL FUSE FOR PROTECTION OF ELECTRICAL DEVICES FROM OVERHEATING

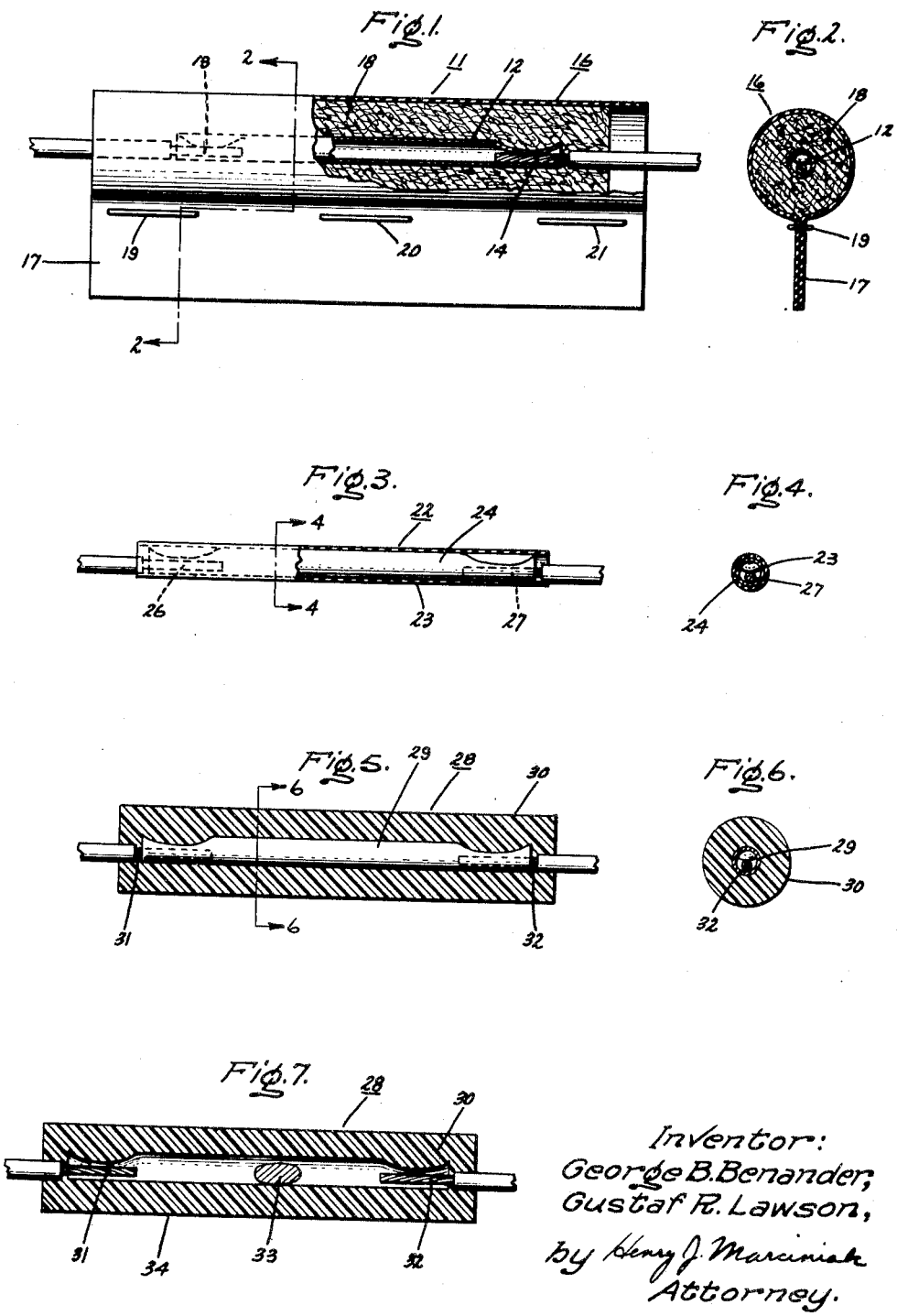

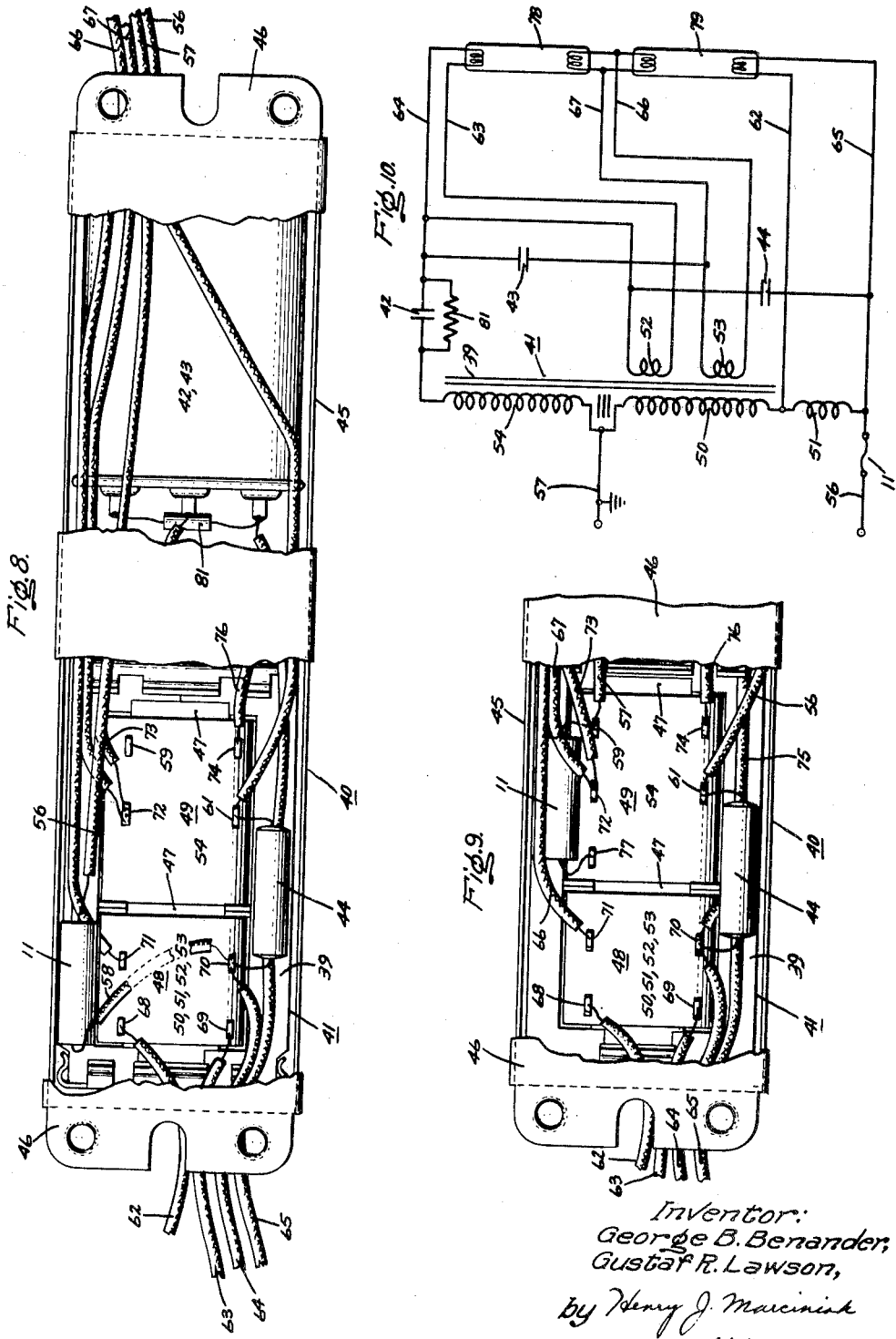

George B. Benander, Oaklawn, and Gustaf R. Lawson, West Warwick, R.I., assignors to General Electric Company, a corporation of New York
Filed Oct. 3, 1960, Ser. No. 60,052
3 Claims. (Cl. 200—131)

This invention relates to thermal fuses and more particularly to thermal fuses adapted to interrupt current flow in an electrical circuit in response to action of heat in the vicinity of the fuse.

Thermal fuses may be used to prevent damage that may be caused by an overheated electrical device or to protect an electrical device against damage resulting from overheating. In many cases improper functioning of the electrical device is accompanied by a significant temperature rise. In such applications, a temperature sensing device may be more effective in interrupting the power supplied to a device than a current overload type of fuse and may be used in a circuit protected by a current overload fuse.

An example of an electrical device in which a thermal fuse may be advantageously used is a fluorescent lamp ballast. A ballast usually includes a high reactance transformer and an oil filled capacitor and is generally encapsulated with a potting compound consisting of an asphalt and sand mixture. An electrical failure of the ballast usually is accompanied by an overheating of the unit. Overheating may cause the potting compound to become fluid and splatter out of the metal ballast case. It may also cause the capacitor to expand and rupture.

In order to prevent a ballast from causing damage to the fixture in which it is installed and to the property in the vicinity of the ballast, it is desirable to have a thermal fuse incorporated in the ballast which would interrupt the power supply to the ballast before the temperature of the unit reaches a point at which the potting compound may become fluid or at which an oil-filled capacitor may rupture.

The thermal fuses to which this invention relates are essentially temperature responsive devices. A thermal fuse would normally be placed at a location in the electrical apparatus where it could readily detect any temperature rise caused by an electrical failure early enough to cause the unit to fail safely before any damage is likely to occur. If the thermal fuse is to be incorporated in a ballast, it may be embedded in the potting compound which is a thermally conducting material. In such an application the thermal fuse would deactivate the ballast when the potting compound reaches a predetermined temperature.

Where the thermal fuse is to be embedded in a potting compound or in a resin encapsulant, it is necessary that the thermal fuse be so designed that it will not be activated prematurely while the encapsulating material is being applied to the fuse and the electrical device. Further, it is desirable that a thermal fuse suitable for incorporation in an electrical apparatus be small, easy to assemble and inexpensive to manufacture.

It is therefore an object of this invention to provide an improved thermal fuse which will achieve the desired results set forth above.

Another object of the invention is to provide an improved thermal fuse which will interrupt an electrical circuit at a predetermined temperature and will be capable of withstanding exposure to temperatures in excess of the predetermined temperature for relatively short intervals.

A more specific object of the invention is to provide an improved thermal fuse that is inexpensive to manufacture.

In accordance with the invention we have provided a thermal fuse that is activated in response to temperature and is comprised of a hollow electrically conductive link having a predetermined melting temperature range and provides a current conduction path between a pair of lead terminals. To provide a delay in time between the instant the environmental temperature reaches the predetermined temperature range and the time at which the hollow link reaches the predetermined temperature range, an insulating fuse body may be used. The fuse body may substantially encase the fusible link and have a thermal conductivity permitting the fuse to withstand temperatures at or above the predetermined melting temperature range of the fusible link for a relatively short interval of time. Upon melting of the fusible link a cavity is provided wherein the molten link is allowed to collapse and interrupt the current conduction path between the terminal leads.

The subject matter which we regard as our invention is set forth in the appended claims. The invention itself, however, together with further objects and advantages thereof may be better understood by referring to the following description taken in conjunction with the accompanying drawings in which:

FIG. 1 is a partially sectionalized view of the thermal fuse in accordance with the invention;

FIG. 2 is a sectional view corresponding to the view shown in FIG. 1 along the line 2—2;

FIG. 3 is a partially sectionalized view of another embodiment of the invention in which a rigid paper tube is used to encase the fusible alloy link;

FIG. 4 is a sectional view corresponding to the view shown in FIG. 3 along the line 4—4;

FIG. 5 is a partially sectionalized view of another embodiment of the invention;

FIG. 6 is a sectional view corresponding to the view shown in FIG. 5 along the line 6—6;

FIG. 7 is a view corresponding to the view illustrated in FIG. 5 showing the fuse when it is activated;

FIG. 8 is a plan view of a ballast without a potting compound and with a portion of the cover removed, showing the thermal fuse of the invention utilized in a ballast circuit;

FIG. 9 is a partial view of the ballast shown in FIG. 8 showing the thermal fuse of the invention connected in another location in the ballast circuit of FIG. 8; and FIG. 10 is a schematic circuit diagram showing the ballast of FIG. 8 connected in circuit with a pair of fluorescent lamps.

Referring now to FIGS. 1 and 2, a thermal fuse 11 in accordance with the invention is illustrated. A hollow electrically conductive link 12 provides a conduction path between a pair of lead terminals 13, 14. In the illustrative embodiment of the invention we used a tin and bismuth fusible alloy having a melting temperature of approximately 130 degrees centigrade. Although the fusible link in the exemplification of the invention is tubular in shape, it will be appreciated that other hollow cross sectional shapes can be used.

As shown in FIG. 1, the ends of the tubular fusible link 12 are crimped over the terminals 13, 14. If desired, the lead terminals 13, 14 may be soldered to the ends of the fusible link 12 or attached by other known methods which will join the fusible link 12 in electrical contact with the terminal leads 13, 14. Crimping, of course, eliminates the need for any special forming or secondary type of manufacturing operations. Further, we have found that the tubular shape of the fusible link 12 permits the molten metal to readily flow and also insures positive interruption of the circuit when the link 12 melts.

Thus, the cavity or space provided when the molten walls of the tubular link 12 collapse is sufficient in volume to permit the molten metal to ball up and interrupt the current conduction path.

In the thermal fuse 11 shown in FIGS. 1 and 2, a fuse body 16 is provided to substantially encase the link 12. The fuse body 16 is comprised of the paper covering 17 and the insulating filler 18. Staples 19, 20, 21 are provided to secure the paper covering 17. The insulating filler 18 makes it possible to subject the thermal fuse 11 for a short interval of time to temperatures above the melting point of the fusible link 12. The thermal fuse 11 used to exemplify the invention was embedded in an asphaltic potting compound, which was poured over the fuse 11 at a temperature that exceeded the melting temperature of the fusible link 12. The amount of insulation required to prevent the fuse from activating during the potting operation was determined by trial and error. Insulating material, such as fiberglass or rock wool, was found to be a satisfactory filler 18.

It will be seen that in the sectional view of FIG. 2 that the fusible link 12 is approximately centered within the insulating filler 18 contained within the paper covering 17. Paper or plastic tubing may be used in lieu of the paper covering 17 illustrated in FIGS. 1 and 2. Of course, it will be understood that if the thermal fuse 11 is to be used in an application wherein it will not be subjected during installation to a temperature in excess of the melting temperature of the fusible link 12, the insulating filler 18 may be eliminated.

In FIGS. 3 and 4 we have illustrated a thermal fuse 22 in accordance with the invention, in which a tubular fuse body 23 is positioned over a hollow fusible link 24 without any insulation interposed between the fusible link 24 and the fuse body 23. The fusible link 24 provides a current conduction path between lead terminals 26, 27. The tubular fuse body 23 is readily inserted over the tubular fusible link 24 after it is attached to the two lead terminals 26, 27.

FIGS. 5 and 6 illustrate an embodiment of the invention wherein a thermal fuse 28 is comprised of a hollow fusible link 29 joining terminal leads 31, 32 and a fuse body 30 formed of resinous material. The resinous material provides the fusible link 29 with a protective shell which may serve the purpose also of insulating the fusible link 29 in order to prevent premature activation when the thermal fuse 28 is exposed to temperatures above the melting temperature of the link 29 for a short period of time. A suitable material for use as a fuse body 30 is one which will not react either with the fusible link 29, the terminal leads 31, 32 or the potting compound if the thermal fuse 28 is to be embedded in a potting compound. Further, it is desirable that the material possess a suitable thermal conductivity and electrically insulate the fusible link 29. Epoxy and polyester resins which are curable at temperatures below the predetermined melting point of the link 29 may be employed.

Thermal fuses 11, 22, 28 shown in FIGS. 1, 3 and 5 operate in a similar manner. In FIG. 7 we have illustrated an activated thermal fuse, which is the thermal fuse 28 shown in FIGS. 5 and 6. It will be seen that the tubular fusible link 29 has melted and formed a droplet 33 spheroidal in shape within the cavity 34 defined by the hollow fusible link 29 within the fuse body 30. Proper functioning of the thermal fuse 28 depends upon the molten link being provided with a void wherein it can flow away from the terminal leads 31, 32 as the surface tension of the molten link causes it to assume the shape of a spheroidal droplet 33 and thereby interrupt the current conduction path between terminal leads 31, 32.

The material used as the hollow link of the present invention must be a good electrical conductor and have a predetermined melting temperature range selected for the particular application of the fuse. The low melting temperature fusible alloys are suitable materials. Most of the fusible alloys can be extruded in a tubular shape and can be soldered. The melting temperature and composition of typical fusible alloys that can be used are given in Table I.

Table 1

| Melting Temperature, Centigrade | Composition of Fusible Alloy, Percent by Weight | | | | |
| --- | --- | --- | --- | --- | --- |
| | Tin | Lead | Bismuth | Cadmium | Indium |
| 91.5 | 40.2 | | 51.6 | 8.2 | |
| 102 | 26.0 | | 54.0 | 20.0 | |
| 120 | 55.0 | 44.0 | | | 1.0 |
| 135 | 5.0 | 32.0 | 45.0 | 18.0 | |
| 138 | 42.0 | | 58.0 | | |

In the illustrative embodiment of the invention, the fusible alloy link used had an inside diameter of .06 of an inch and an outside diameter of .109 of an inch. The melting temperature of the alloy fusible link was 130 degrees centigrade. The composition of the alloy was as follows:

Element— Percentage by weight
Bismuth ------------------------------------- 56.8
Lead --------------------------------------- 2.0
Tin ---------------------------------------- 41.2

Each of the thermal fuses 18, 22, 28 of FIGS. 1, 3 and 5 functions in the following manner. The fuse is generally positioned with respect to the electrical apparatus so that it can sense any overheating. The location will depend on the particular type of apparatus with which the fuse is associated and the type of electrical failures which may occur in the apparatus. Overheating of the apparatus will cause the ambient temperature of the fuse to rise. When the hollow fusible link is heated to its predetermined melting temperature it melts. Due to the hollow configuration of the link, a cavity is provided for the molten link to flow and assume a spheroidal shape thereby interrupting the current conduction path and opening the circuit. When the apparatus cools sufficiently, the molten fusible alloy hardens in the spheroidal shape it assumed during its molten state and the circuit remains open. Thus, the thermal fuse of the present invention removes a malfunctioning electrical device from the line. Once the thermal fuse has been activated it cannot be reset to an operating position.

The fuse body being of insulating material provides a short time delay before the ambient heat reaches the fusible link. This time delay is required in applications where the thermal fuse of the invention is intended to be embedded in a thermally conductive material which must be poured over the thermal fuse in the electrical apparatus at a temperature above the melting point of the fusible link. It may be necessary to provide a thermal barrier between the fusible link and the material during the pouring operation. If a faster responding fuse is required, the amount of thermal insulation interposed between the fusible link and the ambient environment must be reduced.

In FIG. 8, the thermal fuse 11 of the invention is shown in a ballast 40 comprising a high reactance transformer 41, a pair of capacitors 42, 43, a radio interference capacitor 44, and a ballast case 45 including a cover plate 46. The transformer 41 is of the shell type and has a magnetic core 39 including an elongated central winding core leg 47 on which the coils 48, 49 are mounted. The coil 48 has a primary winding 50 and three heating windings 51, 52, 53. The coil 49 includes a secondary winding 54. Only the external connections of the ballast transformer 41 are shown in FIGS. 7 and 8. The connections of the transformer windings 50, 51, 52, 53, 54 are shown schematically in FIG. 9 wherein like reference numerals are used to identify corresponding parts and connections.

A pair of input leads 56, 57 are provided for connecting the ballast to an alternating current power source. As shown in FIG. 10, the lead 56 is intended for connection to the ungrounded side of the power supply and is connected in the ballast circuit to one end of the fuse 11. The other end of the fuse 11 is connected by the lead 58 to a terminal 70 on coil 48 corresponding to the lower end of winding 51 in FIG. 10 (see also FIG. 8). The other input lead 57 is connected to terminal 71 on coil 48 corresponding to the junction between the primary winding 50 and the secondary winding 54 in FIG. 10.

Six external leads 62, 63, 64, 65, 66, 67 are provided for connection to a pair of fluorescent lamps. Leads 62, 63, 65 are connected to terminals 68, 69, 70, respectively, on coil 48. It will be seen that terminal 70, to which lead 65 is joined, also serves as a connection point for one end of capacitor 44. As is shown in FIG. 8, the other end of capacitor 44 is connected to terminal 61. It will be noted that lead 66 is brought out from terminal 71 and lead 67 is brought out from terminal 72 to which lead 73 connecting capacitor 43 is also joined. Terminal 74 serves as a connection point for lead 76 which is connected to capacitor 42.

As shown in FIG. 8, the temperature responsive fuse is connected to the input lead 56 which is for connection to the ungrounded side of the power supply. Thus, it will be seen that when the fuse 11 is activated an open circuit will occur in the input lead 56 and the power to the ballast circuit will be cut off. The fuse 11 is located approximate to the coil 48 and overlies the laminations of the magnetic core 39. In this location it can readily sense a temperature rise in the coil 48 and in other parts of the ballast 40.

In the partial view of the ballast of FIG. 9, the fuse 11, in accordance with the invention, is connected across terminals 59, 77 at a location adjacent to the coil 49. It will be seen that the input terminal 57 is connected directly to terminal 59. Since the start (not shown) of the secondary winding 54 is also connected to terminal 59, the fuse 11 is connected to one end of the primary winding 50. When fuse 11 is activated, it opens the primary winding circuit. The primary winding 50 is therefore disconnected from the power supply and the ballast apparatus fails safe.

The circuit diagram of FIG. 10 illustrates schematically the manner in which the leads and ballast components of FIG. 8 are connected in circuit with a pair of fluorescent lamps 78, 79. The circuit connections of ballast 40 illustrated in FIG. 9 are essentially the same as those shown in FIG. 8, except that fuse 11 is connected in the primary winding circuit between lead 57 and the primary winding 50. Like reference numerals are used in the schematic circuit of FIG. 10 to identify the corresponding components and leads of FIGS. 8 and 9.

As shown in FIG. 10, input leads 56, 57 are connected to the primary winding 50. The primary winding 50 is connected in autotransformer relation with secondary winding 54. The power factor capacitor 42 is connected in series with the secondary winding 54. Capacitor 43 is provided as an aid in starting the lamps 78, 79 and is connected in parallel with lamp 78. The current for heating the cathodes of the fluorescent lamps 78, 79 is provided by means of the heating windings 51, 52, 53. The capacitor 44 may be connected in the circuit as shown for the purpose of reducing radio interference. A resistor 81 may be connected across capacitor 42 to discharge the capacitor 42 when the ballast 40 is disconnected from the power source.

In both illustrative embodiments of the invention shown in FIGS. 8 and 9, the thermal fuse 11 of the invention is located adjacent to the magnetic core of transformer 41 and in proximity to one of the coils 48, 49. Preferably, the fuse 11 is located near a coil since short circuits in the coil winding are frequent causes of ballast failures. Further, its proximity to the core steel will permit the fuse 11 to readily sense temperature rises in other parts of the ballast 40. It will be readily appreciated that the fuse 11 can be located at other locations in the ballast case 45.

Temperature range, as the term is used herein, denotes the temperature or temperatures at which a material melts. It will be appreciated that some materials do not have precise melting points. Thus, the term "temperature range" includes materials which have precise melting points and those that do not.

While this invention has been explained by describing several exemplifications thereof, it will be apparent that many modifications may be made without departing from the spirit and scope of the invention as defined in the appended claims.

What we claim as new and desire to secure by Letters Patent of the United States is:

1. A thermal fuse for interrupting a current flow in an an electrical lead in response to its environmental temperature comprising a tubular fusible link providing a current conduction path capable of handling overload current in the electrical lead and having a predetermined melting temperature range, a tubular fuse body substantially covering said tubular fusible link and providing sufficient thermal insulation to permit said thermal fuse to withstand temperatures above the predetermined melting temperature range of said fusible link for a relatively short interval of time, said tubular fusible link providing a cavity sufficient in volume to permit said fusible link when heated to said predetermined melting temperature range to collapse and interrupt the current conduction path in response to the environmental temperature.

2. The thermal fuse as set forth in claim 1 wherein the fuse body is comprised of a filler of glass fibers and a paper covering to hold the filler in contact with said tubular fusible link.

3. A thermal fuse for interrupting a current flow in an electrical lead in response to environmental temperature comprising a tubular fusible link having a predetermined melting temperature range and providing a current conduction path in the electrical lead, a fuse body including an insulating layer of glass fibers filler substantially encasing said fusible link, means for maintaining said insulating layer on said fusible link, said insulating layer permitting said fuse to withstand temperatures above the predetermined melting temperature range of the fusible link for a relatively short interval of time and providing a time delay between the instant said fuse body reaches said predetermined temperature range and the point at which said fusible link reaches the predetermined temperature range, said tubular fusible link providing a cavity wherein said fusible link when heated to said predetermined temperature range is allowed to collapse thereby interrupting the current conduction path in response to the environmental temperature.

References Cited in the file of this patent

UNITED STATES PATENTS

| | | |
|---|---|---|
| 876,984 | Mackintosh | Jan. 21, 1908 |
| 931,478 | Poole | Aug. 17, 1909 |
| 1,192,879 | Ferrell | Aug. 1, 1916 |
| 1,221,275 | Bleecker | Apr. 3, 1917 |
| 1,530,264 | Hope | Mar. 17, 1925 |
| 2,326,031 | Hodnette et al. | Aug. 3, 1943 |
| 2,411,460 | Peters et al. | Nov. 17, 1946 |
| 2,645,690 | Edsall et al. | July 14, 1953 |
| 2,782,283 | Schwennesen | Feb. 19, 1957 |
| 2,830,156 | Burgess | Apr. 8, 1958 |
| 2,971,129 | Carlson et al. | Feb. 7, 1961 |

FOREIGN PATENTS

| | | |
|---|---|---|
| 507,334 | Great Britain | June 13, 1939 |
| 637,961 | Great Britain | May 31, 1950 |
| 1,035,749 | Germany | Aug. 7, 1958 |